United States Patent
Lan et al.

(10) Patent No.: US 7,877,112 B2
(45) Date of Patent: Jan. 25, 2011

(54) SIM CARD DATA TRANSFER SYSTEM AND METHODS

(75) Inventors: Wei-Ming Lan, Morrisville, NC (US); Daniel Lam, Sterling, VA (US)

(73) Assignee: Nextel Communications Inc., Reston, VA (US)

( * ) Notice: Subject to any disclaimer, the term of this patent is extended or adjusted under 35 U.S.C. 154(b) by 1350 days.

(21) Appl. No.: 11/133,388

(22) Filed: May 20, 2005

(65) Prior Publication Data
US 2006/0111147 A1 May 25, 2006

Related U.S. Application Data

(60) Provisional application No. 60/629,300, filed on Nov. 19, 2004.

(51) Int. Cl.
*H04M 1/00* (2006.01)
*H04B 1/38* (2006.01)

(52) U.S. Cl. .................. 455/558; 455/411; 455/406; 455/419; 455/405; 455/552.1; 455/466; 455/415; 713/168; 713/182; 379/357.01; 379/357.02; 709/230

(58) Field of Classification Search .............. 455/558, 455/411, 406, 415, 419, 410, 552.1, 466, 455/405
See application file for complete search history.

(56) References Cited

U.S. PATENT DOCUMENTS

| | | | | |
|---|---|---|---|---|
| 6,014,561 A * | 1/2000 | Molne | .......................... | 455/419 |
| 6,141,564 A * | 10/2000 | Bruner et al. | ................. | 455/558 |
| 6,549,773 B1 * | 4/2003 | Linden et al. | ............. | 455/426.1 |
| 6,591,116 B1 * | 7/2003 | Laurila et al. | ................ | 455/558 |
| 6,704,789 B1 * | 3/2004 | Ala-Laurila et al. | ......... | 709/230 |
| 6,707,915 B1 * | 3/2004 | Jobst et al. | ................... | 380/247 |
| 6,813,503 B1 * | 11/2004 | Zillikens et al. | ............. | 455/457 |
| 6,859,650 B1 * | 2/2005 | Ritter | .......................... | 455/406 |
| 6,978,157 B1 * | 12/2005 | Amiens | ....................... | 455/558 |
| 6,985,754 B1 * | 1/2006 | Pedersen et al. | .......... | 455/556.2 |
| 7,054,594 B2 * | 5/2006 | Bloch et al. | ................. | 455/41.2 |
| 7,054,660 B2 * | 5/2006 | Lord | ........................... | 455/558 |
| 7,072,651 B2 * | 7/2006 | Jiang et al. | ................ | 455/432.1 |
| 7,082,297 B2 * | 7/2006 | Tuomi et al. | ................. | 455/411 |
| 7,089,036 B2 * | 8/2006 | Prise | ........................... | 455/558 |
| 7,092,702 B2 * | 8/2006 | Cronin et al. | ................ | 455/418 |
| 7,130,648 B1 * | 10/2006 | Fournier et al. | ............. | 455/466 |
| 7,139,372 B2 * | 11/2006 | Chakravorty et al. | ..... | 379/114.01 |
| 7,181,505 B2 * | 2/2007 | Haller et al. | ................. | 709/219 |
| 7,184,758 B2 * | 2/2007 | Corneliussen et al. | ....... | 455/419 |
| 7,239,632 B2 * | 7/2007 | Kalavade et al. | ............ | 370/389 |
| 7,239,877 B2 * | 7/2007 | Corneille et al. | .......... | 455/456.3 |
| 7,239,881 B2 * | 7/2007 | Lekutai | ....................... | 455/466 |
| 7,266,371 B1 * | 9/2007 | Amin et al. | .................. | 455/419 |
| 7,269,638 B2 * | 9/2007 | Vestergaard et al. | ........ | 709/219 |
| 7,275,217 B2 * | 9/2007 | Saraswat et al. | ............ | 715/764 |
| 7,283,808 B2 * | 10/2007 | Castell et al. | ............... | 455/413 |
| 7,289,495 B2 * | 10/2007 | Roy | ............................. | 370/381 |

(Continued)

*Primary Examiner*—Marceau Milord

(57) ABSTRACT

System and method for transferring data from a first subscriber identity module (SIM) card to a second SIM card are provided. The first SIM card is inserted into a wireless telephone. Software is downloaded to the wireless telephone. The software converts the data from a format of the first SIM card to a format of the second SIM card. The second SIM card is inserted into the wireless telephone, and the converted data is written to the second SIM card.

16 Claims, 1 Drawing Sheet

U.S. PATENT DOCUMENTS

| | | | |
|---|---|---|---|
| 7,295,853 B2 * | 11/2007 | Jin et al. | 455/518 |
| 7,324,473 B2 * | 1/2008 | Corneille et al. | 370/328 |
| 7,330,712 B2 * | 2/2008 | Kirkup et al. | 455/411 |
| 7,336,973 B2 * | 2/2008 | Goldthwaite et al. | 455/558 |
| 7,340,264 B2 * | 3/2008 | Islam et al. | 455/466 |
| 7,363,056 B2 * | 4/2008 | Faisy | 455/558 |
| 7,363,363 B2 * | 4/2008 | Dal Canto et al. | 709/223 |
| 7,558,598 B2 * | 7/2009 | Lapstun et al. | 455/556.1 |
| 7,623,852 B2 * | 11/2009 | Gnuschke | 455/419 |
| 2004/0024846 A1 * | 2/2004 | Randall et al. | 709/219 |
| 2006/0105810 A1 * | 5/2006 | Gnuschke | 455/558 |
| 2007/0226805 A1 * | 9/2007 | Jeal et al. | 726/27 |

* cited by examiner

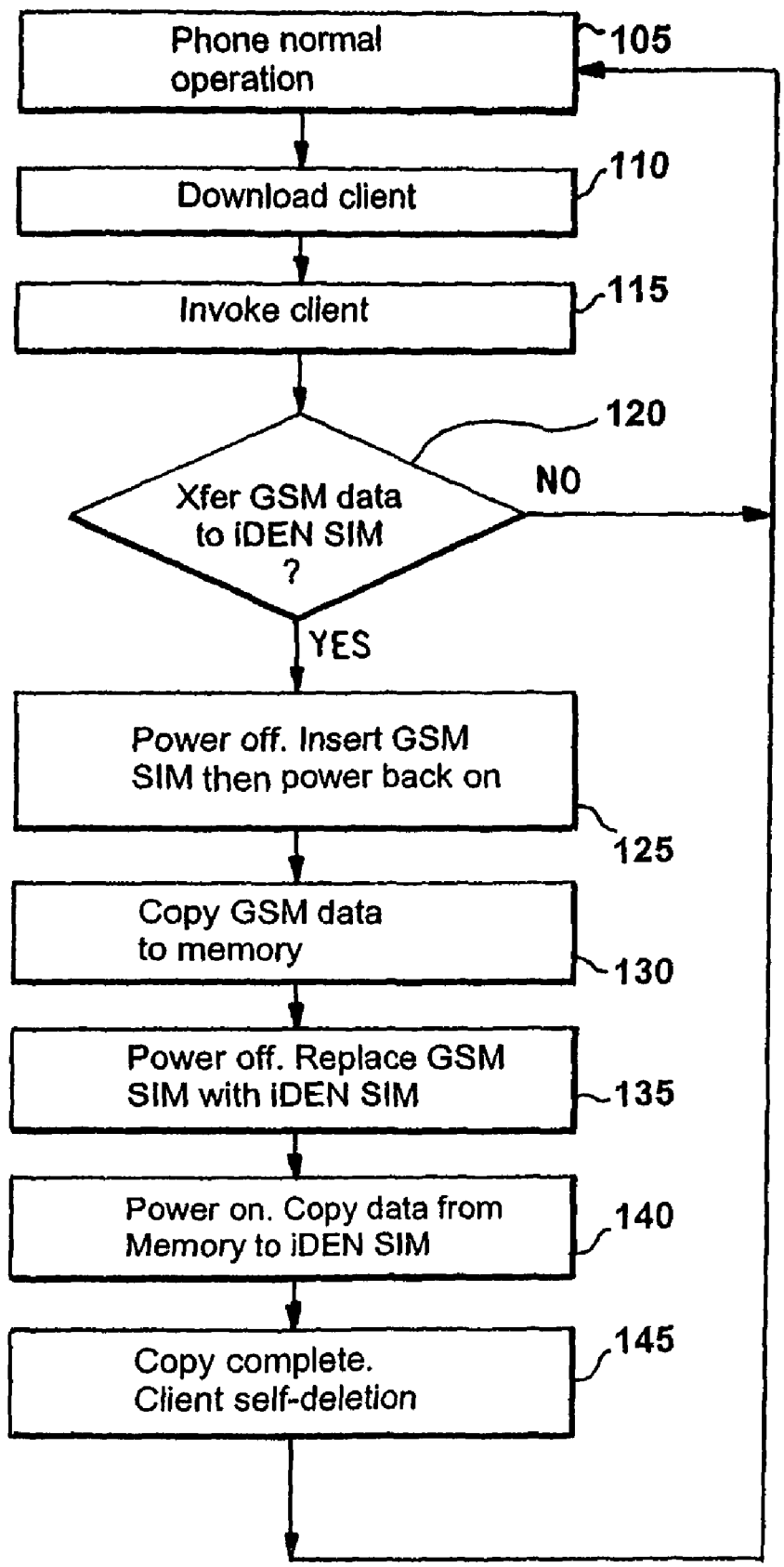

SIM CARD DATA TRANSFER SYSTEM AND METHODS

The present application claims priority from U.S. Provisional Patent Application No. 60/629,300, filed on Nov. 19, 2004, the content of which is hereby incorporated by reference into this application.

BACKGROUND OF THE INVENTION

Wireless network operators typically compete for customers based upon cost of services. Customers can obtain discounts by signing multi-year contracts with a wireless network operator. Once a multi-year contract expires, a customer typically signs a new agreement with the same wireless network operator in order to maintain the same wireless telephone number.

The FCC has recently mandated local number portability. Local number portability allows customers to sign up for service with a new wireless network operator while maintaining the same wireless telephone number. However, there are still impediments for customers when switching wireless network operators. For example, after using a wireless telephone for a period of time, a customer has typically programmed a large number of contact information into their existing wireless telephone. In order to maintain customer loyalty, wireless network operators may provide services which allow the customer to transfer this contact information into a new wireless telephone provided by the same network operator. Due to the number of different wireless network standards, it is more difficult for a competing wireless network operator to offer the same service.

SUMMARY OF THE INVENTION

Systems and methods for subscriber identity module (SIM) card data transfer are provided. In accordance with exemplary embodiments of the present invention, a wireless telephone downloads software which can convert data from a format of a first SIM card to a format of a second SIM card.

Other objects, advantages and novel features of the present invention will become apparent from the following detailed description of the invention when considered in conjunction with the accompanying drawings.

BRIEF DESCRIPTION OF THE DRAWING FIGURES

The sole FIGURE illustrates an exemplary method for transferring subscriber identity module (SIM) card information from one SIM card to another in accordance with the present invention.

DETAILED DESCRIPTION OF THE PREFERRED EMBODIMENTS

Although there are a number of different wireless network standards, some standards are more compatible with each other than others. For example, an iDEN network, such as that owned and operated by Nextel Communications, Inc. of Reston, Va., operates using a protocol based on those used in GSM networks. However, there are a number of differences between the protocols and other operational features employed in iDEN and GSM networks. For example, while both iDEN and GSM wireless telephones employ a subscriber identity module (SIM) card, the formatting of the data between the two networks is different. Accordingly, while a SIM card from a GSM wireless mobile unit, such as a wireless phone, can be physically inserted into an iDEN wireless mobile unit, the data stored on the GSM SIM card cannot be used by the iDEN wireless mobile unit.

One technique for transferring data from a GSM SIM card to an iDEN SIM card requires the iDEN wireless network operator to transfer the data. Specifically, a customer brings a GSM SIM card to an iDEN network operator's retail store or service center and a representative of the iDEN network operator transfers the data from the GSM SIM card to an iDEN SIM card. However, this requires the customer to take the time to travel to the iDEN network operator's retail store or service center, which a customer may consider to be inconvenient. Additionally, this procedure increases the operating expense of the wireless network operator because this procedure requires the wireless network operator's personnel to perform this manual transfer of data.

In accordance with exemplary embodiments of the present invention, a customer can transfer data from a GSM SIM card to an iDEN SIM card without requiring a visit to a wireless network operator's retail store or service center. According to exemplary embodiments of the present invention, wireless mobile unit client software for transferring data from a GSM SIM card to an iDEN SIM card is stored in a wireless network operator's network, for example, in an over-the-air provisioning (OAP) server. The software can be downloaded to a customer's wireless mobile unit, thereby allowing the customer to transfer data from a GSM SIM card to an iDEN SIM card.

The sole FIGURE illustrates an exemplary method for transferring data from a GSM SIM card to an iDEN SIM card. A customer, who is a former GSM user, buys an iDEN phone and wants his data transferred from the GSM SIM card to the iDEN SIM card in his new phone, which is now otherwise ready for normal operation in the iDEN mode (step 105). The user downloads wireless telephone client software over-the-air from the carrier's network server (step 110). The user then activates the downloaded client software (step 115). The client software then queries, via the user interface (UI), whether the user wants to now transfer the GSM data to the iDEN SIM card (step 120). If an acknowledgement of transfer request is not made, then the phone reverts back to normal operation. If the confirmation is made, then the client software asks the user to turn off the phone and subsequently replace the current SIM card (provisioned iDEN SIM) with the old GSM SIM card and subsequently turn the phone back on (step 125). When the GSM SIM card is inserted in the phone, the client software copies all the GSM data onto the phones internal memory (step 130). In the next phase, the user is asked to turn off the phone after the GSM data has been copied into the phone's internal memory then and to replace the GSM SIM card with the iDEN SIM card (step 135). The downloaded telephone client software then copies the data stored in the phone's memory onto the iDEN SIM card (step 140).

Upon completion of the copying process, the user is now equipped with all personal data from the old GSM SIM card and, because the client software is configured for a one time use, it will then delete itself from the phone's memory in order to free up memory space (145). The phone then reverts back to its normal operation (105).

Although the present invention has been described above in connection with transferring data from a GSM SIM card to an iDEN SIM card, the present invention is equally applicable to the transfer of data from an iDEN SIM card to a GSM SIM card. Moreover, the present invention is also applicable to the transfer of data between any two types of memory cards for different wireless mobile units and networks. And, although the present invention has been described above in connection with wireless telephones, the present invention can be used for any type of wireless device, including wireless personal digital assistants (PDAs), wireless pagers, wireless e-mail stations, and the like.

Moreover, while the invention has been described in connection with various embodiments, it will be understood that the invention is capable of further modifications. This application is intended to cover any variations, uses or adaptations of the invention following, in general, the principles of the invention, and including such departures from the present disclosure as known, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for transferring data from a first subscriber identity module (SIM) card having a first data format to a second subscriber identity module (SIM) card having a second data format, the method comprising the acts of:
   downloading, into a wireless device, software;
   inserting the first SIM card into the wireless device when power to the wireless device is off;
   reading, by the software, data from the first SIM card;
   converting, by the software, the data having said first data format of the first SIM card to said second data format of the second SIM card;
   replacing the first SIM card in the wireless device with the second SIM card; and
   writing, by the software, the converted data onto the second SIM card when the power to the wireless device is on.

2. The method of claim 1, wherein the first SIM card is a GSM SIM card and the second SIM card is an iDEN SIM card.

3. The method of claim 1, wherein the first SIM card is an iDEN SIM card and the second SIM card is a GSM SIM card.

4. The method of claim 1, further comprising the act of sorting the converted data prior to writing the converted data onto the second SIM card.

5. The method of claim 1, wherein the data includes telephone numbers.

6. The method of claim 1, wherein the acts of downloading and converting occur when said wireless device is in a normal operating mode.

7. The method of claim 1, wherein the software is stored in a memory of the wireless device, the method further comprising the act of:
   deleting the software from the wireless device memory.

8. The method of claim 1, further comprising the act of:
   activating, by a user of the wireless device, the software.

9. The method of claim 1, wherein the data read from the first SIM card is substantially all of the personal data stored on the card.

10. The method of claim 1, wherein the software is downloaded from an over-the-air provisioning (OAP) server.

11. The method of claim 1, wherein a user interface prompts a user as to whether the data should be transferred from the first to the second SIM card.

12. A method for transferring data from a first subscriber identity module (SIM) card having a first data format to a second subscriber identity module (SIM) card having a second data format, the method comprising the acts of:
   downloading, into a wireless device, software;
   reading, by the software, data from the first SIM card;
   converting, by the software, the data having said first data format of the first SIM card to said second data format of the second SIM card;
   writing, by the software, the converted data onto the second SIM card, wherein the method, further includes the acts of
   turning off power to said wireless device and inserting said first SIM card into said wireless device prior to said act of reading data from said first SIM card;
   replacing said first SIM card in said wireless device with said second SIM card; and
   turning on power to said wireless device prior to said act of writing converted data to said second SIM card.

13. A program storage device readable by a machine tangibly embodying a program of instruction executable by the machine to perform method acts for directing a user to transfer data from a first subscriber identity module (SIM) card having a first data format to a second subscriber identity module (SIM) card having a second data format, said method acts comprising:
   downloading, into a wireless device, software;
   inserting the first SIM card into the wireless device when power to the wireless device is off;
   reading, by the software, data from the first SIM card;
   converting, by the software, the data from said first data format of the first SIM card to said second data format of the second SIM card; and
   replacing the first SIM card in the wireless device with the second SIM card; and
   writing, by the software, the converted data onto the second SIM card when the power to the wireless device is on.

14. The program storage device according to claim 13 wherein the first SIM card is a GSM SIM card and the second SIM card is an iDEN SIM card.

15. The program storage device according to claim 13 wherein the first SIM card is an iDEN SIM card and the second SIM card is a GSM SIM card.

16. The program storage device of claim 13, wherein the software is stored in a memory of the wireless device, the method further comprising the act of:
   deleting the software from the wireless device memory.

* * * * *